Sept. 14, 1965 R. J. HARRIS 3,205,711
SAMPLE INJECTION IN GAS CHROMATOGRAPHY
Filed April 11, 1963 2 Sheets-Sheet 1

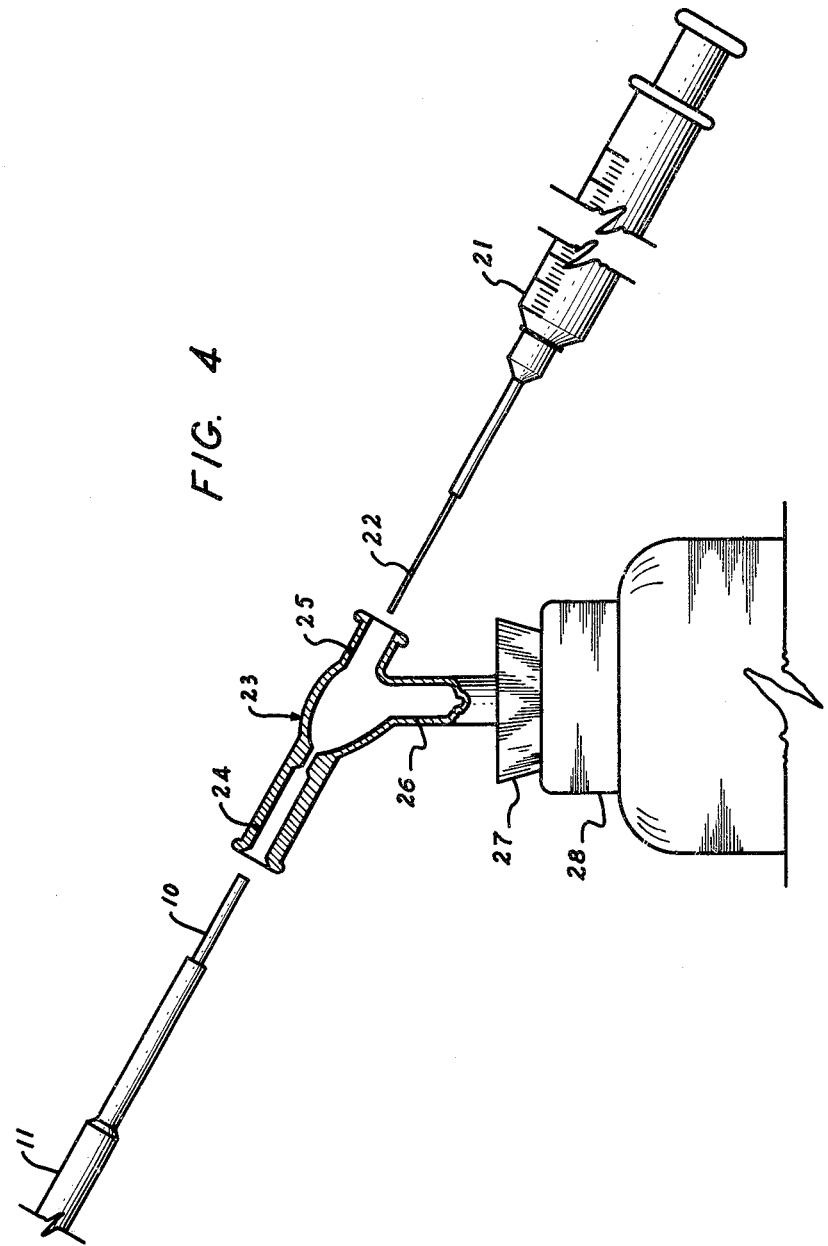

United States Patent Office 3,205,711
Patented Sept. 14, 1965

3,205,711
SAMPLE INJECTION IN GAS CHROMATOGRAPHY
Rano Joseph Harris, Baton Rouge, La., assignor to Microtek Instruments, Inc., Baton Rouge, La., a corporation of Louisiana
Filed Apr. 11, 1963, Ser. No. 272,335
14 Claims. (Cl. 73—422)

This invention relates to improvements in the art of gas chromatography and more particularly to improvements in introducing samples into the sample inlet systems of gas chromatographs.

As is well known, the gas chromatograph is composed of a chromatographic column containing appropriate solid packing material, such as crushed firebrick, through which is passed a carrier fluid (e.g., helium, nitrogen, or the like) at a uniform rate of flow. This gaseous carrier fluid in turn serves to transport through the column the vaporized components of the material being subjected to analysis, vaporization of the sample generally being accomplished by heating the injected sample by means of a heater positioned within the chamber housing the column. The gaseous stream emerging from the chromatographic column is introduced into detector apparatus which measures a physical characteristic of the gas—e.g., thermal conductivity, density, charged particle ionization characteristics, infrared radiation adsorption, or the like. One commonly used effluent detection device consists of a hydrogen flame ionization detector. Alternately, the detector can consist, for example, of a means of measuring the thermal conductivity of the exit gas relative to that of the incoming carrier gas. Thus, as the different components of the sample appear in the exit helium carrier gas, the thermal conductivity will change. The identity of a compound in the sample causing a change in thermal conductivity is obtained by calibration of the apparatus with respect to time. For a given set of operating conditions, any single compound will have a characteristic time of appearance in the exit carrier gas relative to the time of injection of the sample. This information, e.g., change in thermal conductivity, obtained by the detector is customarily plotted against time. The amount of the compound in the sample can then be determined from the height or magnitude in the change recorded by the detector, or more properly can be obtained by the area under the curve caused by the compound.

Introduction of liquid samples into the carrier gas stream for vaporization and passage through the chromatographic column frequently involved use of common hypodermic needle syringes. Thus, in effecting an injection the needle was forced through a rubber septum and a suitable quantity of the liquid sample was in effect squirted into the sample vaporization chamber through which the carrier gas flowed. Such a technique, while workable, left much to be desired. In the first place, the septa would tend to spring leaks, especially after a number of injections had been made, and the resultant leakage of carrier gas from the chromatographic apparatus adversely affects the performance of the chromatographic apparatus. For example, when such leakage occurs in apparatus using a thermal conductivity detection system, a strong disturbance may be observed in the baseline signal of the detector output readout device, e.g., a potentiometric recorder. This in turn can lead to serious errors and difficulties in interpreting the analytical data. Furthermore, the accuracy, precision and reproducibility of the results suffered because of variability in injection times, variations in the quantities of injected samples, uneven vaporization of the sample, and, at least in the case of wide boiling range samples, fractionation of the sample. Thus, even with the observance of reasonable standards of care, the use of the hypodermic needle injection technique has been acknowledged to result in serious analytical errors of reproducibility.

A significant step forward in the art of sample injection in gas chromatography is described in U.S. Letters Patent No. 2,991,647, granted July 11, 1961. By use of the sample inlet system described in that patent, the above problem of air leakage through rubber septa has been effectively and efficiently overcome. In addition, the pipet for introducing small fluid samples described in that patent has been found in actual service to result in significant improvements in the accuracy, precision and reproducibility of analytical results as compared with the results achieved using the hypodermic needle mode of sample injection. The advantages of the capillary pipet introduction system are particularly evident when used with highly volatile samples such as pentane.

A feature making possible such improvements in the quality of the analytical determinations through the use of the pipet described in the above-referred-to patent is the provision therein of a capillary tube open at both ends with one end of the tube opening on a side wall so that when the tube filled with the sample is inserted into the sample inlet apparatus described in the patent, the flow of the carrier gas being temporarily interrupted, imposes a force upon the liquid in the pipet and thereupon expels or purges the capillary tube of its contents. For a more complete appreciation of my prior contributions to this art, reference should be made to the patent under discussion, including FIGURE III thereof which describes a pipet primarily designed for use with liquid samples.

Despite the significant improvements in sample injection techniques afforded by the subject matter described in the foregoing patent, several shortcomings still remained. In the first place, improvements in the art led to the discovery that the use of chromatographic columns of smaller internal diameters gave rise to higher separation efficiencies reflected in terms of increased theoretical plates. However, in order to achieve these higher separation efficiencies it is essential to introduce samples of less than 5 microliters, and preferably less than 1 microliter, a microliter being one-one millionth of a liter. The liquid pipet injection technique described in the above patent when applied to samples in the range of below 2 microliters results in significant loss of analytical precision and accuracy. Furthermore, when applying that injection technique to liquid samples of high viscosity the probability of analytical error was higher than desired, irrespective of the size of the viscous sample being used. Consequently, there has been a distinct need in the art for an effective and efficient means for overcoming these and related deficiencies associated with the injection of relatively small samples into the gas chromatograph.

Accordingly, it is an object of this invention to fulfill the foregoing need. More particularly, an object of this invention is to provide a novel sample injector which is especially suitable for use with liquid (and, indeed, solid) samples in the range of from about 0.2 to about 5 microliters. Another object is to improve the accuracy and precision of the analytical results from gas chromatography as applied to liquid and solid samples by effecting and providing improvements in the techniques and apparatus for injecting such samples into the sample vaporization chamber of the gas chromatograph. Still another object is to provide auxiliary equipment and methods for use in filling the novel sample injector of this invention with the desired liquid sample, and with the desired solid sample. Other objects will be apparent from the ensuing description and the accompanying drawings.

Referring to the drawings.

Figure 3:
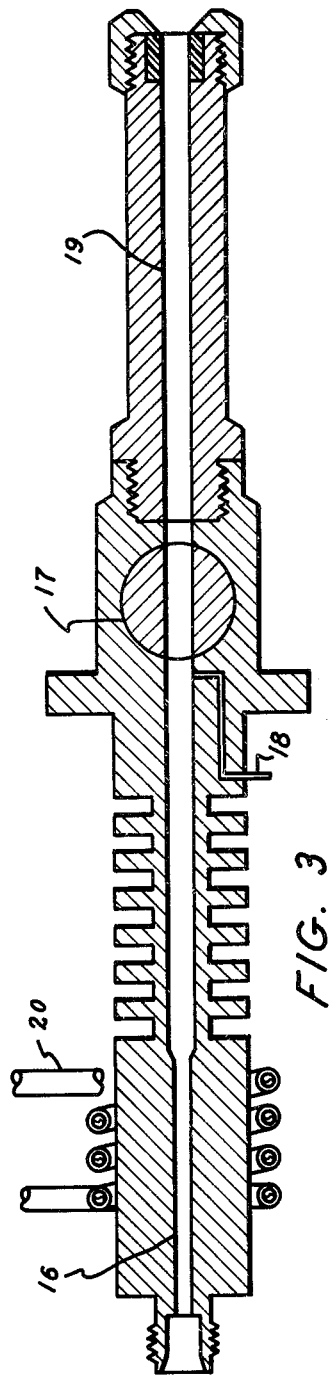

FIGURE 3 represents a top section view of a typical, but preferred, sample inlet system and sample vaporization chamber with which the sample injector of this invention may be associated in actual use; and FIGURE 4 illustrates a combination of this invention particularly adapted for filling the injector with a liquid sample to be injected into the sample vaporization chamber of the gas chromatograph and serving to illustrate the cooperation effected among the elements of the combination during a filling operation, the elements including the injector, a needle syringe, and a housing bringing the injector and the syringe into operative and cooperative association with each other.

Figure 1:
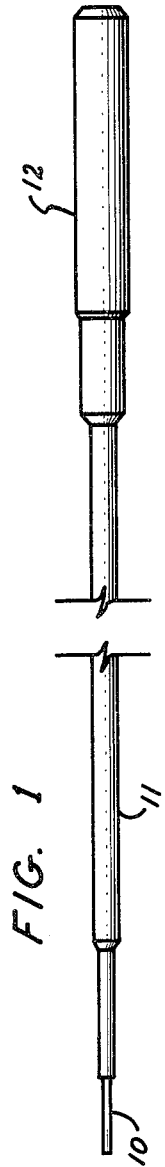
FIGURE 1 illustrates a sample injector of this invention.

Referring now to FIGURE 1, it will be seen that the injector of this invention is composed of sample carrying means 10 attached to a cylindrical shank or shaft 11 aligned therewith. Although not essential, it is preferable to provide a hand-grippable handle 12 in axial alignment with the shaft 11 and attached to the end thereof opposite the sample carrying means 10.

Figure 2:
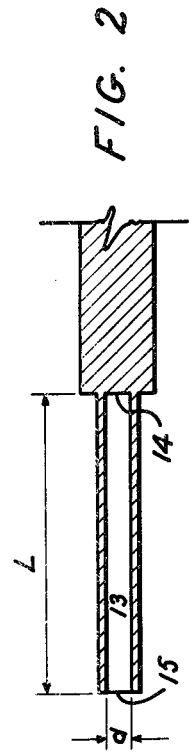
FIGURE 2 is an enlarged sectional view of the sample carrying end of the injector, the section being taken along the longitudinal axis of the injector.

As brought out by FIGURE 2, the sample carrying end of the injector is a thin-walled capillary tube 13 which is sealed at one end 14, but open at the other end 15, the sealed end being the one which abuts, or is closer to, shaft 11. Additional important features of the capillary tube 13 are, first, it has a capacity of from about 0.2 microliter to about 5 microliters, preferably 0.25 microliter to 2 microliters; and secondly, the ratio between its length, L, to its inner diameter, d, is within the range of from about 10 to 1 up to about 200 to 1, and preferably from about 20 to 1 to about 50 to 1. Most preferably, this ratio is approximately 30 to 1.

It is to be noted that the capillary tube 13 may be fixedly (i.e., permanently) attached to the end of the cylindrical shaft 11 or it may be detachably attached thereto. In the case of liquid sample injectors of this invention, it is preferable to provide permanent attachment as this minimizes the likelihood of leakage of fluid sample at the locus of attachment. In the case of injectors for use with normally solid samples (i.e., samples which are in the solid state of aggregation at room temperature) the capillary tube 13 is preferably detachably attached to the end of the cylindrical shaft 11. Such attachment can be readily accomplished by providing threads on at least one end of the exterior surface of the capillary tube which mate with a corresponding female thread located within a cylindrical opening of suitable depth within the end of shaft 11. Alternatively, a cylindrical recess may be provided in the end of shaft 11 which is of essentially the same diameter and circumference as the outer diameter and circumference of the capillary tube. In this way the capillary tube is simply pressed into the cylindrical recess to a suitable depth (e.g., a minor fraction of the length of the capillary tube), thereby providing an appropriate means of detachable attachment. Other means of effecting this type of attachment will now be evident to those skilled in the art.

In preferred form, the capillary tube is made of alloy steel or other suitable metal which (a) has structural strength at temperatures ranging as high as 500° C., (b) is essentially inert to chemical interaction with the liquid samples to be associated therewith, and (c) has the property of good conductance of heat. Illustrative of suitable metals possessing these characteristics are copper-nickel alloys, silver, nickel, platinum, titanium, and the like, stainless steel being particularly preferred from the standpoints of ready availability, low cost, and optimum structural and sufficient heat transfer properties. In actual practice capillary tubes ranging from about 0.254 to about 1 inch in length and from about 0.005 to about 0.02 inch in inner diameter have afforded excellent results. The thickness of the walls of the capillary tube may range from about 0.001 to about 0.05 inch with the range of from about 0.005 to about 0.025 inch being most suitable. Although the inner diameter, $d$, of the capillary tube may vary along its length, L, in most preferred form the capillary tube is substantially uniform in dimensions along its length, not only in inner diameter, but in wall thickness as well. In actual practice a capillary tube 0.39 inch long, having an inner diameter of 0.013 inch, an outer diameter of 0.028 inch, and a capacity of 1 microliter, and made from stainless steel (316 SS) has been found to give excellent results in the injection of samples ranging from inert hydrocarbons (carbon numbers ranging from about 5 to about 40, etc.) to reactive substances such as mercaptans, aldehydes, organic acids, and the like.

As will be seen by inspection of FIGURE 3, the injector of this invention is inserted into a sample inlet system of a gas chromatograph so that the sample carrying end of the injector (filled with the sample, preferably utilizing the filling apparatus and techniques to be described hereinafter) is placed in operative relationship with the sample vaporization chamber 16 which leads into the chromatographic column (not shown). More particularly, ball valve 17 is initially placed in the closed position so that the carrier gas flowing into inlet 18 passes into and through the sample vaporization chamber 16 so as to provide an inert atmosphere in which the injection is to be made. Thereupon the filled injector is inserted into conduit 19, the inner diameter of which mates with (i.e., is essentially the same as) the outer diameter of the cylindrical shaft 11 of the injector. Then the ball valve 17 is turned to the open position (as shown), the mating between the shaft 11 and the inner circumference of the conduit 19 preventing escape of the carrier gas. Next, the injector is inserted through open valve 17 so that the sample carrying means 10 confronts or opens into the sample vaporization chamber 16. By providing the preferred hand-grippable handle 12 having a diameter in excess of shaft 11, this acts as a stop by engaging the outer end of conduit 19, thereby positioning the sample carrying means 10 at the desired locus within the sample vaporization chamber 16 heated via heating means 20 which preferably encases the outer walls of the vaporization chamber. Although the normally continuous flow of carrier gas is interrupted when the probe-like handle covers the opening in inlet 18, the purge effected prior to that time is sufficient to provide an inert atmosphere within the sample vaporization chamber and the remainder of the chromatographic column.

As the above-described insertion is completed, the heat generated within the heating means 20 is transferred through the walls of the sample vaporization chamber 16, through the thin walls of the capillary tube 13, and thence into the sample contained within the tube. Because of the particular configuration of capillary tube 13, the micro-sized sample is suddenly and substantially uniformly vaporized. The resultant vapors build up a momentary pressure within the capillary and this pressure causes the contents to be expelled through the open end of the capillary, this expulsion occurring as a surge or plug of vapors. In short, substantially the entire sample is expelled uniformly and rapidly into the vaporization chamber and thence into the chromatographic column so that such undesirable phenomena as sample fractionation, slow diffusion, etc., are markedly suppressed or eliminated. The net result is that extremely accurate and precise analyses have been made possible even using extremely small-sized samples which heretofore could not be analyzed so accurately or precisely by gas chromatography.

As an indication of the excellent reproducibility (repeatability) which has been afforded through the use of the injector of this invention as compared with previously known injection devices, a series of comparative experiments was conducted. In these experiments 0.7 microliter samples of n-heptane were repeatedly injected into a gas chromatograph operated under uniform conditions. In a first group of such injections a commercially available micro-syringe was used to effect each of 14 injections. An identical number of such injections was then made using an 0.7 microliter injector of this invention. In all cases the integrated output signal of the detector was recorded with a commercially available integrator thereby providing a reliable measure of the quantity of the sample injected into the chromatographic system. Statistical treatment of the resultant data at 95 percent confidence limits showed the following standard deviations (sigma):

| | 2 sigma, percent |
|---|---|
| Micro-syringe | ±5.2 |
| Microliter injector | ±1.8 |

In further experimentation it was determined that a commercially available silicone oil of high viscosity could not be adequately injected utilizing sampling devices previously known. However, the use of the injector of this invention resulted in efficient introduction of this silicone oil into the gas chromatograph.

Another aspect of this invention is the provision of means and techniques for filling liquid into the above-described injector. Referring to FIGURE 4, the means in question comprise an appropriate needle syringe 21 and a housing 23 composed of a first conduit 24 adapted to maintain the capillary tube of the injector in a relatively fixed position and a second conduit 25 confronting the first conduit and adapted to guide the needle into the open end of the capillary tube. It will be seen that the needle syringe 21 possesses a needle 22, the outer diameter of which is less than the inner diameter of the capillary tube 10. Also, the length of needle 22 should be comparable to or in excess of the length of capillary tube 10. Housing 23 enables the facile insertion of needle 22 into capillary tube 10 while minimizing the likelihood of bending or even breaking either or both members. Making such results possible is the way by which conduits 24 and 25 confront each other. As shown in FIGURE 4, the interior of conduit 24 possesses the general exterior configuration of the capillary tube to be filled and therefore when the tube is inserted into this conduit it is held in a relatively fixed and stable position. As the needle of the syringe (which contains the sample to be transferred) is inserted into conduit 25 which is axially aligned with conduit 24, the needle is channeled or guided into the opening of the restrained capillary tube because the walls of conduit 25 circumferentially converge as the mouth of the capillary is approached so that the aperture of this conduit achieves at this zone of confrontation a frusto-conical configuration. Once the needle 22 is sufficiently inserted into capillary tube 10, the sample transfer is accomplished by injecting a sufficient quantity of liquid from the syringe into the capillary tube while slowly withdrawing the syringe from the capillary tube so that the volume occupied by the needle is replaced by the liquid sample. Housing 23 is preferably fabricated from glass or similar transparent materials (e.g., plastics) so that the injection process may be observed visually and complete filling noted by the accumulation near or flow of excess liquid from the mouth of the capillary tube. The housing may however be made of translucent or even opaque materials (e.g., metals) if desired. It may be held in any desired position by means of clamps or similar gripping devices so as to enable the operator to handle the injector in one hand and operate the syringe with the other. It is preferred however to position the housing in such a way that the capillary tube is maintained in a relatively-fixed, downwardly-inclined position by virtue of the downward inclination of conduit 24. This causes conduit 25 which is axially aligned with conduit 24 to guide the syringe needle upwardly inclined into the capillary tube. An advantage of this is that during injection from syringe to capillary tube, the excess liquid flows downwardly and away from the exterior surfaces of the capillary tube, meaning that little if any sample adheres to such exterior surfaces and needs to be removed therefrom as by wiping with a cloth before making the injection into the gas chromatograph.

A particularly preferred housing is depicted in FIGURE 4 inasmuch as a third conduit 26 leads downwardly from the zone of confrontation between conduits 24 and 25. This third conduit serves a dual function. First of all, it serves to transport overflow liquid from the capillary tube away from conduits 24 and 25, especially since the slope on the lower portion of the wall of conduit 26 nearest to conduit 24 is steeper than the angle of inclination of the axis through conduits 24 and 25, yet not so steep as to prevent contact between the overflow liquid and said lower portion of the wall. Secondly, conduit 26 functions as a support means for the entire housing because this conduit is readily inserted into a stopper 27 placed into the mouth of a waste bottle 28. This waste bottle serves as a very stable base for support of the foregoing apparatus.

Consequently, a particularly preferred adapter of this invention for use in filling a capillary tube with a needle syringe comprises (1) an adapter for use in filling a capillary tube with a needle syringe which adapter comprises (a) a first conduit adapted to maintain the capillary tube in a relatively-fixed, downwardly-inclined position; (b) a second conduit linearly confronting said first conduit and adapted to guide the needle upwardly inclined into the open end of the capillary tube; and (c) a third conduit leading downwardly from the zone of confrontation between said first and second conduits and adapted to transport overflow liquid from the capillary tube away from said first and second conduits.

A particular feature of the above capillary tube filling procedure and apparatus of this invention is that as the sample is injected from the needle syringe into the capillary tube, not only is the capillary tube completely and uniformly filled with the sample, but the excess liquid actually flushes the interior surfaces of the capillary tube, even on the upper surfaces, so as to remove and rinse away therefrom traces of impurities which may have remained after the prior injection. This self-cleaning function is made possible firstly because of the fact that the dimensions and capacity of the capillary tube are conducive to the wetting of all of its interior surfaces by the liquid being injected therein, and secondly, by the fact that the needle initially occupies a significant portion of the volume of the capillary tube and encourages the liquid to flow via capillary action along and through the annular spaces about and around the needle. The net result is that during the filling operation the capillary tube is purged of any trace impurities and the ensuing sample injection into the gas chromatograph involves the use of the correct amount of the actual sample desired to be subjected to analysis.

To fill the solid sample injectors used in accordance with and provided by this invention, several filling techniques may be employed. Thus, the injector may be placed in vertical position with the open end of the capillary tube 13 pointing upwards and the requisite quantity of sample allowed to drop into and fill the capillary tube. A preferred mode of filling solid sample injectors of this invention involves removing a detachably attachable capillary tube 13 from shaft 11 and then tamping the tube down onto a portion of the sample maintained on a suitable flat surface. In this way the sample is forced upwardly into the capillary tube to the appropriate height. If desired, a mating stop or plug may be provided which will occupy a given portion of the volume of the capillary tube so that the amount of sample which can be received within the capillary tube is limited by the presence of this cylindrical stop. Such stop should have an outer diameter which is essentially identical to the inner diameter of the capillary tube and should have a length such that the volume in the capillary tube displaced thereby leaves room for a constant sample weight from about 0.1 to about 10 milligrams. This stop is then removed from the filled capillary tube (the filling being accomplished by tamping the tube containing the stop down onto the solid sample on a suitable flat surface) which is then affixed to the end of shaft 11. Thereupon the injector is ready for use in making a sample injection in accordance with the procedure and principles of operation described hereinabove. An additional advantage in providing a detachably attachable capillary tube is that this provides a convenient means of precisely determining the weight of the sample prior to injection inasmuch as the filled or partially filled tube can be readily weighed on a microanalytical balance.

The materials of construction for the remaining parts of the various elements of the several embodiments of this invention will be apparent to those skilled in the art. As many widely different modes of practicing this invention will now be evident to those skilled in the art, it is not intended that this invention be limited by the foregoing drawings and description of the principles and practice of this invention. Rather, what is intended to be claimed and covered hereby is:

I claim:

1. In an injector for insertion into the sample vaporization chamber of a gas chromatograph and composed of sample carrying means attached to a shaft aligned therewith, the improvement in which said means comprise a thin-walled capillary tube which is characterized (a) by being sealed at one end, (b) by being open at its other end, (c) by having a capacity of from about 0.2 to about 5 microliters, (d) by having a ratio between its length and its inner diameter within the range of from about 10:1 up to about 200:1, and (e) by having a substantially uniform wall thickness along its length.

2. The injector of claim 1 further characterized in that said capillary tube is detachably attached to the end of said shaft.

3. The injection of claim 1 further characterized in that said capillary tube has a capacity of from about 0.25 to about 2 microliters and said ratio is from about 20:1 up to about 50:1.

4. The injector of claim 1 further characterized in that said ratio is approximately 30:1.

5. In combination, the injector of claim 1 and means for filling the capillary tube thereof with a liquid sample, which means comprise (1) a needle syringe, the needle of which is capable of being inserted into said tube and (2) a housing composed of a first condit adapted to maintain the capillary tube in a relatively fixed position, and a second conduit linearly confronting said first conduit and adapted to guide said needle into the open end of said capillary tube.

6. The combination of claim 5 wherein said first conduit is adapted to maintain the capillary tube in a relatively-fixed, downwardly-inclined position and said second conduit is adapted to guide said needle upwardly inclined into the open end of said capillary tube.

7. In combination, the injector of claim 1 and means for filling the capillary tube thereof with a liquid sample, which means comprise (1) a needle syringe, the needle of which is capable of being inserted into said tube and (2) a housing composed of a first conduit adapted to maintain the capillary tube in a relatively fixed position, a second conduit linearly confronting said first conduit and adapted to guide said needle into the open end of said capillary tube, and a third conduit leading downwardly from the zone of confrontation between said first and second conduits and adapted to transport overflow liquid from the capillary tube away from said first and second conduits.

8. The injector of claim 1 further characterized in that said capillary tube is permanently attached to the end of said shaft.

9. The injector of claim 1 further characterized in that said ratio is from about 20:1 up to about 50:1.

10. Apparatus for rapidly introducing a micro quantity of sample into a gas chromatograph inlet which comprises the injector of claim 1 and heating means for vaporizing a sample contained in the capillary tube of said injector when positioned within said inlet.

11. An adapter for use in filling a capillary tube with a needle syringe, which adapter comprises (1) a first conduit adapted to maintain the capillary tube in a relatively-fixed, downwardly-inclined position, (2) a second conduit linearly confronting said first conduit and adapted to guide the needle upwardly inclined into the open end of the capillary tube, and (3) a third conduit leading downwardly from the zone of confrontation between said first and second conduits and adapted to transport overflow liquid from the capillary tube away from said first and second conduits.

12. An injector adapted for insertion into the sample vaporization chamber of a gas chromatograph comprising a thin-walled capillary tube attached to the end of a shaft axially aligned therewith so that said tube is sealed at the end adjacent said shaft and is open at its other end, said tube being further characterized in that it has a capacity of from about 0.2 to about 5 microliters, in that it has a ratio between its length and its inner diameter within the range of from about 20:1 up to about 50:1, and in that it has a substantially uniform wall thickness and bore diameter along its length.

13. An injector adapted for insertion into the sample vaporization chamber of a gas chromatograph comprising a thin-walled stainless steel capillary tube permanently attached to the end of a shaft axially aligned therewith so that said tube is sealed at the end adjacent said shaft and is open at its other end, said tube being further characterized in that it has a capacity of from about 0.2 to about 5 microliters, in that it has a ratio between its length and its inner diameter within the range of from about 20:1 up to about 50:1, and in that it has a substantially uniform wall thickness and bore diameter along its length.

14. An injector adapted for insertion into the sample vaporization chamber of a gas chromatograph comprising a thin walled stainless steel capillary tube detachably attached to the end of a shaft axially aligned therewith so that said tube is sealed at the end adjacent said shaft and is open at its other end, said tube being further characterized in that it has a capacity of from about 0.2 to about 5 microliters, in that it has a ratio between its length and its inner diameter within the range of from about 20:1 up to about 50:1, and in that it has a substantially uniform wall thickness and bore diameter along its length.

References Cited by the Examiner

UNITED STATES PATENTS

| 2,702,479 | 2/55 | Black et al. | 73—422 |
| 2,991,647 | 7/61 | Harris. | |
| 3,118,300 | 7/64 | Jenkins | 73—422 X |

RICHARD C. QUEISSER, *Primary Examiner.*

ROBERT L. EVANS, *Examiner.*